US009456375B2

(12) United States Patent
Kang et al.

(10) Patent No.: US 9,456,375 B2
(45) Date of Patent: Sep. 27, 2016

(54) METHOD FOR TRANSMITTING DATA FROM TERMINAL IN WIRELESS COMMUNICATION SYSTEM, AND DEVICE FOR SAME

(75) Inventors: Seunghyun Kang, Anyang-si (KR); Hangyu Cho, Anyang-si (KR); Kyujin Park, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/361,892

(22) PCT Filed: Nov. 30, 2011

(86) PCT No.: PCT/KR2011/009187
§ 371 (c)(1),
(2), (4) Date: May 30, 2014

(87) PCT Pub. No.: WO2013/081208
PCT Pub. Date: Jun. 6, 2013

(65) Prior Publication Data
US 2014/0293783 A1 Oct. 2, 2014

(51) Int. Cl.
*G08C 15/00* (2006.01)
*H04W 28/02* (2009.01)
(Continued)

(52) U.S. Cl.
CPC ............ *H04W 28/02* (2013.01); *H04B 7/026* (2013.01); *H04W 80/02* (2013.01)

(58) Field of Classification Search
CPC ..... H04W 28/02; H04W 80/02; H04B 7/026
See application file for complete search history.

(56) References Cited

U.S. PATENT DOCUMENTS 7,760,702 B2 * 7/2010 Deng ................. H04B 7/15592
370/351
8,509,105 B2 * 8/2013 Kneckt ............. H04W 74/0833
370/252
(Continued)

FOREIGN PATENT DOCUMENTS

| JP | 2009-124692 | 6/2009 |
| KR | 10-2008-0069753 | 7/2008 |
| WO | 2011/129634 | 10/2011 |

OTHER PUBLICATIONS

PCT International Application No. PCT/KR2011/009187, Written Opinion of the International Searching Authority dated Apr. 25, 2012, 18 pages.
(Continued)

*Primary Examiner* — Kevin Mew
(74) *Attorney, Agent, or Firm* — Lee, Hong, Degerman, Kang & Walmey; Jonathan Kang; Michael Monaco

(57) ABSTRACT

A method and an apparatus for transmitting a signal at a cooperative user equipment in a wireless communication system supporting client cooperative communication is provided. The method includes: receiving one or more packets configured in predetermined units from a source user equipment; configuring a data burst respective to the source user equipment based on the predetermined units by including the one or more packets in the data burst based on a priority level; and transmitting the data burst to a base station. Here, the one or more packets are configured in one of service data units (SDUs) and protocol data units (PDUs), and the priority level is same as a priority level used by the source user equipment.

7 Claims, 6 Drawing Sheets

(51) Int. Cl.
  *H04B 7/02* (2006.01)
  *H04W 80/02* (2009.01)

(56) References Cited

U.S. PATENT DOCUMENTS

| | | | |
|---|---|---|---|
| 9,319,955 B2* | 4/2016 | Kim | H04W 36/22 |
| 2006/0034196 A1* | 2/2006 | Casey | H04W 24/06 370/278 |
| 2006/0229014 A1* | 10/2006 | Harada | H04M 1/7253 455/41.2 |
| 2008/0031219 A1* | 2/2008 | Zou | H04W 28/24 370/348 |
| 2008/0192686 A1* | 8/2008 | Cho | H04W 16/14 370/229 |
| 2009/0175214 A1* | 7/2009 | Sfar | H04B 7/15592 370/315 |
| 2009/0185477 A1* | 7/2009 | Lee | H04L 1/1825 370/216 |
| 2009/0186645 A1* | 7/2009 | Jaturong | H04L 5/0007 455/507 |
| 2010/0142421 A1* | 6/2010 | Schlicht | H04W 4/20 370/310 |
| 2010/0315989 A1* | 12/2010 | Reznik | H04B 7/1557 370/315 |
| 2011/0032864 A1 | 2/2011 | Lee et al. | |
| 2011/0053519 A1* | 3/2011 | Jarabek | H04W 88/06 455/68 |
| 2011/0096752 A1* | 4/2011 | Yuk | H04W 12/06 370/331 |
| 2011/0113299 A1* | 5/2011 | Power | H04L 1/18 714/748 |
| 2011/0138245 A1* | 6/2011 | Haustein | H04L 1/1819 714/748 |
| 2011/0176477 A1 | 7/2011 | Lee et al. | |
| 2011/0194485 A1 | 8/2011 | Horneman et al. | |
| 2012/0290650 A1* | 11/2012 | Montuno | H04W 4/008 709/204 |
| 2012/0302272 A1* | 11/2012 | Hakola | H04W 72/10 455/509 |
| 2013/0051277 A1* | 2/2013 | Hakola | H04W 76/023 370/254 |
| 2014/0057670 A1* | 2/2014 | Lim | H04W 8/005 455/509 |
| 2014/0064203 A1* | 3/2014 | Seo | H04W 28/06 370/329 |
| 2014/0126417 A1* | 5/2014 | Kang | H04W 8/005 370/254 |
| 2014/0185529 A1* | 7/2014 | Lim | H04W 76/023 370/328 |
| 2014/0226629 A1* | 8/2014 | Kim | H04W 36/0016 370/331 |
| 2014/0241265 A1* | 8/2014 | Pragada | H04W 72/04 370/329 |

OTHER PUBLICATIONS

European Patent Office Application Serial No. 11876517.1, Search Report dated Nov. 27, 2015, 12 pages.

* cited by examiner

METHOD FOR TRANSMITTING DATA FROM TERMINAL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2011/009187, filed on Nov. 30, 2011, the contents of which are all hereby incorporated by reference herein in their entirety.

FIELD OF THE INVENTION

The present invention relates to a wireless communication system and, more particularly, to a method for transmitting data from a terminal in a wireless communication system, and a device for the same.

BACKGROUND ART

FIG. 1 illustrates an exemplary wireless communication system. Referring to FIG. 1, a wireless communication system (100) includes a plurality of base stations (110) and a plurality of user equipments (or user terminals) (120). The wireless communication system (100) may include a homogeneous network or a heterogeneous network. Herein, the heterogeneous network refers to a network having different network entities, such as a macro cell, a femto cell, a pico cell, a relay station, and so on, co-exist therein. The base station generally corresponds to a fixed station communicating with a user equipment, and each base station (110a, 110b, and 110c) provides services to specific geographical areas (102a, 102b, and 102c). In order to enhance the system performance, the specific area may be divided into a plurality of smaller areas (104a, 104b, and 104c). Each of the smaller areas may be referred to as a cell, a sector, or a segment. In case of an IEEE 802.16 system, a Cell Identity (Cell_ID or IDCell) is assigned based upon the entire system. Conversely, a sector or segment identifier is assigned based upon the specific area, to which each base station provides service, and the sector or segment identifier is assigned with values ranging from 0 to 2. The user equipment (120) is generally distributed throughout the system and may be fixed or mobile. Each user equipment may communicate with one or more base stations via Uplink (UL) or Downlink (DL) at an arbitrary moment. The base station and the user equipment may perform communication with an FDMA (Frequency Division Multiple Access), a TDMA (Time Division Multiple Access), a CDMA (Code Division Multiple Access), an SC-FDMA (Single Carrier-FDMA), an MC-FDMA (Multi Carrier-FDMA), an OFDMA (Orthogonal Frequency Division Multiple Access), or a combination of the above. In this specification, an uplink refers to a communication link from a user equipment to a base station, and a downlink refers to a communication link from a base station to a user equipment.

DETAILED DESCRIPTION OF THE INVENTION

Technical Objects

Hereinafter, based upon the discussions described above, a method for transmitting data from a terminal (or user equipment) in a wireless communication system and a device for the same will be proposed.

Technical Solutions

According to an aspect of the present invention, a method of a cooperative user equipment for transmitting a signal in a wireless communication system supporting client cooperative communication includes receiving one or more packets configured in predetermined units from a source user equipment; configuring a data burst respective to the source user equipment by using the packet; and transmitting the data burst to a base station, and, herein, the one or more packets are configured in one of service data units (SDUs) and protocol data units (PDUs). Herein, the source user equipment may transmit a data burst identical to that of the cooperative user equipment to the base station.

Meanwhile, configuring a data burst may include a step of including the one or more packets in the data burst in accordance with an order of receiving the one or more packets from the source user equipment. And, in this case, the method further includes receiving information on a transmission order of the one or more packets from the source user equipment.

Alternatively, configuring a data burst may also include including the one or more packets in the data burst in accordance with a priority level of a service flow respective to each of the one or more packets. In this case, the method further includes receiving information on a priority level of the service flow from the source user equipment or the base station. The service flow may be identified by a Flow Identifier (FID).

Alternatively, configuring a data burst may include including the one or more packets in the data burst, so that padding bits of the data burst can be minimized, based on sizes of the one or more packets.

Meanwhile, according to another aspect of the present invention, a user equipment device in a wireless communication system supporting client cooperative communication includes a reception module configured to receive one or more packets configured in predetermined units from a source user equipment; a processor configured to configure a data burst respective to the source user equipment by using the packet; and a transmission module configured to transmit the data burst to a base station, and, herein, the one or more packets are configured in one of service data units (SDUs) and protocol data units (PDUs).

Effects of the Invention

According to the exemplary embodiment of the present invention, in the wireless communication system, the user equipment may effectively transmit data via client cooperative communication.

The effects of the present invention will not be limited only to the effects described above. Accordingly, effects that have not been mentioned above or additional effects of the present application may become apparent to those having ordinary skill in the art from the description presented below.

BEST MODE FOR CARRYING OUT THE PRESENT INVENTION

The configuration, application, and other characteristics of the present invention may be easily understood by the exemplary embodiments of the present invention, which will hereinafter be described in detail with reference to the accompanying drawings.

Figure 1:
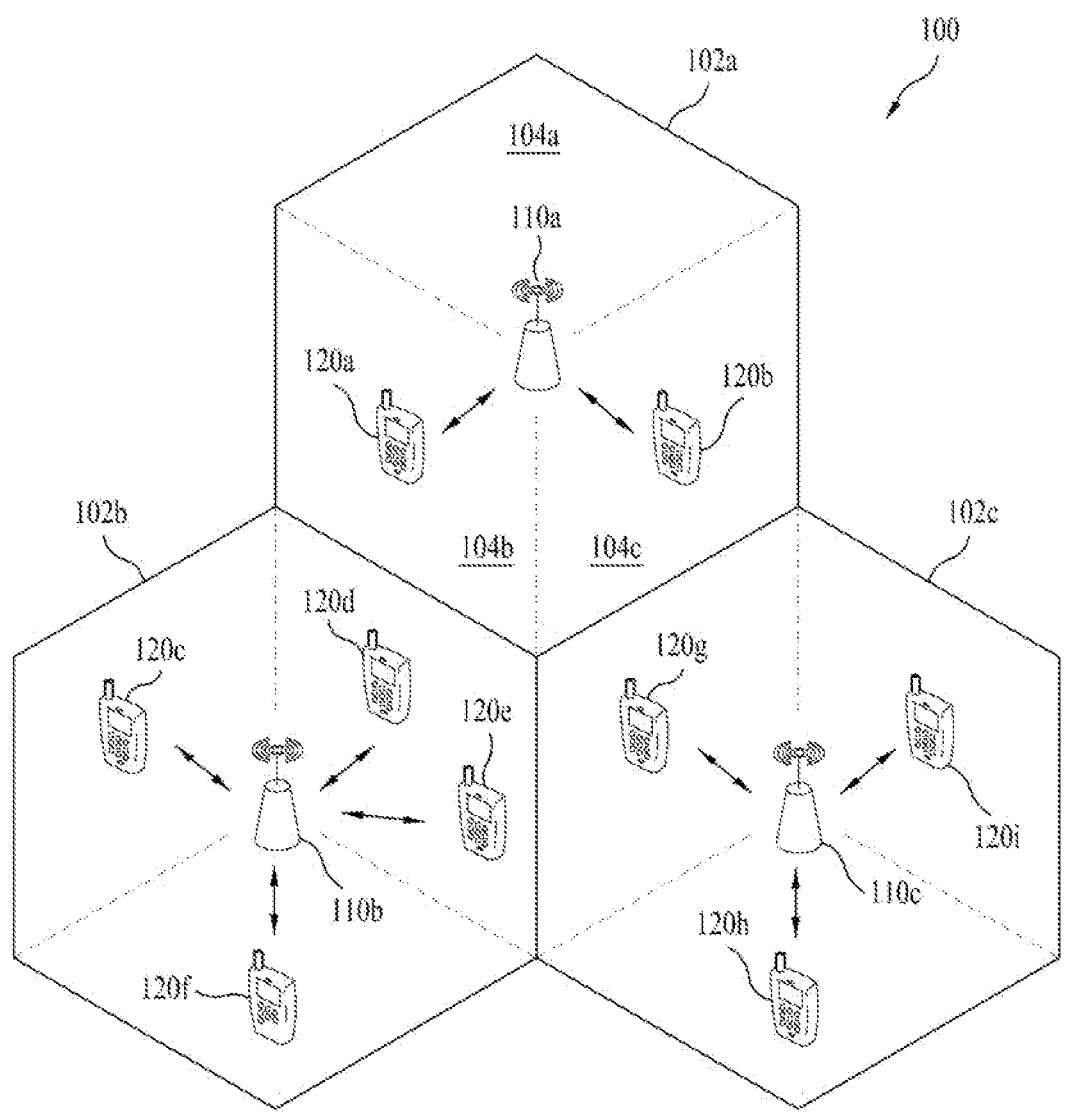
FIG. 1 illustrates an exemplary wireless communication system.
Figure 2:
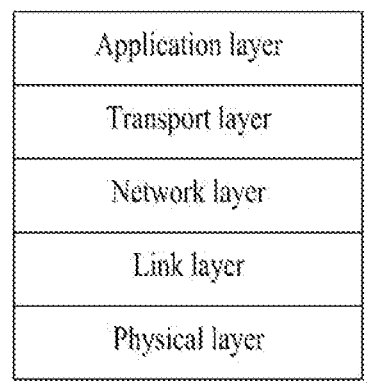
FIG. 2 illustrates an example of a generally used internet protocol stack.

The communication system based upon the internet is generally configured of a Protocol Stack consisting of 5 layers, wherein the configuration of each layer is as shown in FIG. 2.

FIG. 2 illustrates an example of a generally used internet protocol stack.

Referring to FIG. 2, a highest (or most significant) layer of the protocol stack corresponds to an application layer for supporting network application. Then, provided afterwards are a transmission layer (or transport layer) performing a data transmission function between hosts by using TCP/UDP protocols, and a network layer performing data transmission path set-up from a Source to a Destination through an IP protocol. Furthermore, the protocol stack also consists of a link layer performing data transmission and MAC (Medium Access Control) between surrounding (or peripheral) network entities through PPP/Ethernet protocol, and so on, and a physical layer, which corresponds to a lowest (or least significant) layer, performing bit-unit or (bit-wise) transmission of data using a wired or wireless medium.

Figure 3:
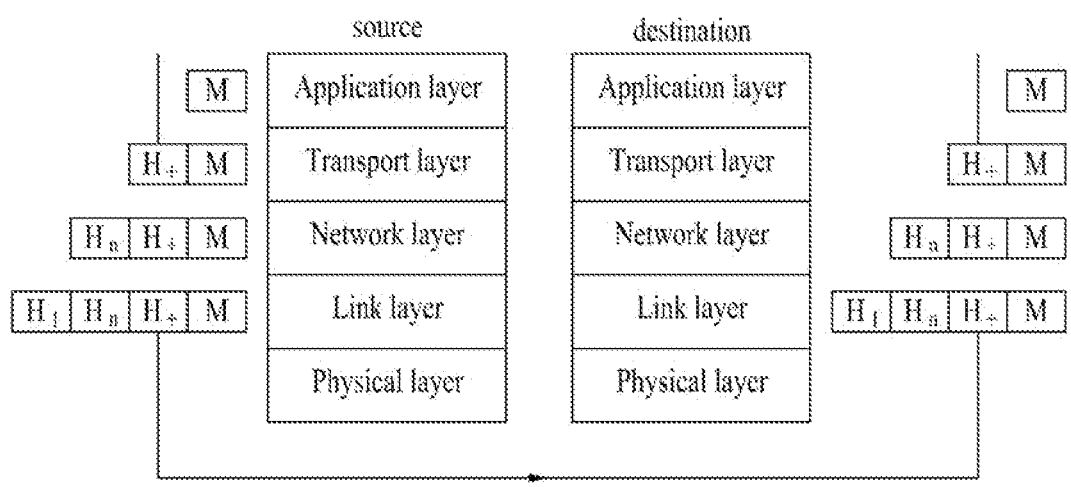
FIG. 3 illustrates operations of each layer, which is generally used for data transmission.

FIG. 3 illustrates operations of each layer, which is generally used for data transmission.

Referring to FIG. 3, in the transmission layer (or transport layer) of the transmitting end, header information is added to a message payload, which is received from the application layer being a higher layer (or upper layer), thereby generating a new data unit. The transmission layer transmits the newly generated data unit back to the network layer being a lower layer. The network layer generates a new data unit by adding header information, which is used by the network layer, to the data received from the transmission layer, and, then, the network layer transmits the newly generated data unit back to the link layer being a lower layer. The link layer generates a new data unit by adding header information, which is used by the link layer, to the data received from the higher layer, and, then, the link layer transmits the newly generated data unit back to the physical layer being a lower layer. The physical layer transmits the data unit, which is received from the link layer, to the receiving end.

The physical layer of the receiving end receives a data unit from the transmitting end and transmits the received data unit to the link layer, which is the higher layer of the physical layer. The receiving end processes the added header for each layer and transmits the message payload having the header removed therefrom to the higher layer. By performing this procedure data transception (or transmission/reception) may be performed between the transmitting end and the receiving end.

In order to perform data transception between the transmitting end and the receiving end, as shown in FIG. 3, a header protocol is added to each layer, thereby performing control functions, such as data addressing, routing, forwarding, data retransmission, and so on.

Figure 4:
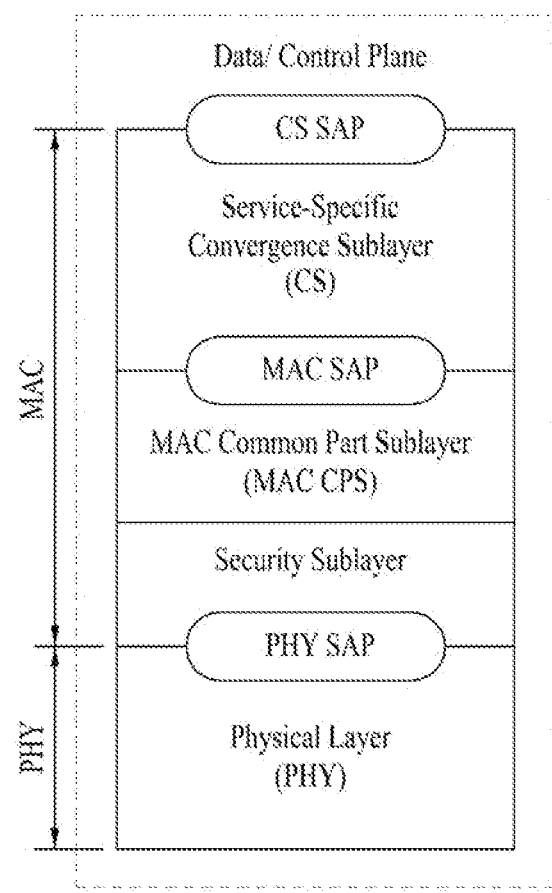
FIG. 4 illustrates a general layer structure in an IEEE 802.16 based communication system.

FIG. 4 illustrates a general layer structure in an IEEE 802.16 based communication system.

Referring to FIG. 4, the MAC layer belonging to the link layer may be configured of 3 sublayers. First of all, a Service-Specific CS (Service-Specific Convergence Sublayer) may modify or map data of an external network, which are received through a CS SAP (Service Access Point) to MAC SDUs (Service Data Units) of the MAC sublayer (CPS: Common Part Sublayer). In this layer, after identifying the SDUs of the external network, a function correlating the corresponding MAC service flow may be included.

Subsequently, as a layer providing essential functions of the MAC, such as system access, bandwidth allocation (or assignment), connection set-up and management, and so on, the MAP CPS receives data, which are categorized by a specific MAC connection, from diverse CSs through the MAC SAP. At this point, QoS (Quality of Service) may be applied to the data transmission and scheduling, which are performed through the physical layer.

Additionally, a Security Sublayer may provide security functions, such Authentication, security key exchange.

As a connection-oriented service, the MAC layer is realized as a concept of transport connection. When a user equipment is registered to the system, a Service Flow may be regulated in accordance with an agreement between the user equipment and the system. If service requirements are changed, a new connection may be set up. Herein, the transport connection defines the mapping between peer convergences processes using the MAC and the service flow, and the service flow defines QoS parameters of the MAC PDU, which are exchanged during the corresponding connection.

A service flow within a transport connection performs an essential function respective to the management of the MAC protocol and provides a mechanism for uplink and downlink QoS management. Most particularly, the service flow may be combined with the bandwidth allocation (or assignment) process.

In order to allow the transmitting end and the receiving end to exchange data within the above-described layer structure, a case of transmitting MAC SDUs (Medium Access Control Service data units) will be assumed. At this point, the MAC SDU is processed to a MAC PDU (Medium Access Control Packet Data Unit). In order to generate such MAC PDU, the base station or the user equipment may include a MAC header to the MAC PDU.

Figure 5:
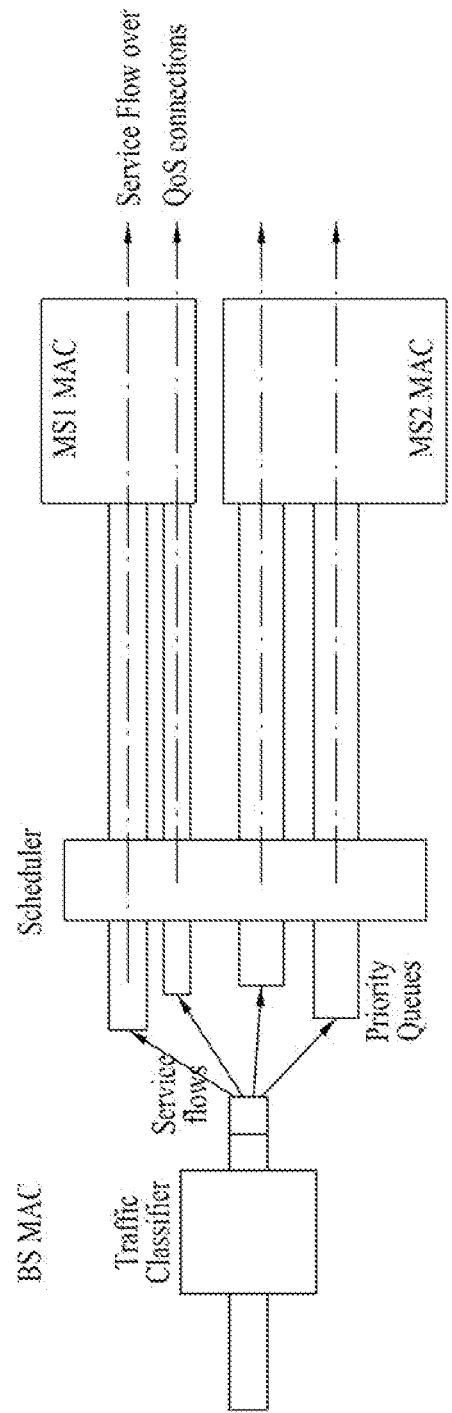
FIG. 5 illustrates a drawing showing a connection and an SF (Service Flow) used in an IEEE 802.16 based communication system.

FIG. 5 illustrates a drawing showing a connection and an SF (Service Flow) used in an IEEE 802.16 based communication system.

As shown in FIG. 5, a logical connection of the MAC Layer maps an SF to a logical connection having a QoS parameter defined therein in order to provide a QoS respective to a higher service flow (SF). Additionally, the logical connection is defined in order to provide a QoS of a MAC layer through an appropriate scheduling in order to transmit data respective to the corresponding connection.

The types of connection that are defined in the MAC layer include a Management Connection, wherein allocation is performed for each user equipment in order to manage the user equipments in the MAC layer, and a Transport Connection, wherein mapping is performed to a service flow for higher service data transmission.

A service flow refers to a MAC transport (or transmission) service providing a one-way (or single direction) packet transmission, wherein an uplink packet is being transmitted by the user equipment, or wherein a downlink packet is being transmitted by the base station. Additionally, the service flow is specified by a group (or collection) of QoS parameters.

In the connection of each AMS (Advance-MS), a 4-bit size FID (Flow ID) is assigned (or allocated), and the FID is used for identifying each connection within a single AMS. Non-overlaying FIDs being assigned to one downlink transport connection may be used in the same AMS, and, similarly, non-overlaying FIDs being assigned to one uplink transport connection may be used in the same AMS. Additionally, the FID being assigned to one downlink transport connection may also be assigned to the uplink transport connection of the same AMS. Accordingly, a combination of an STID (Station Identifier) and the FID may be used for identifying the connections between the AMS and the ABS.

Figure 6:
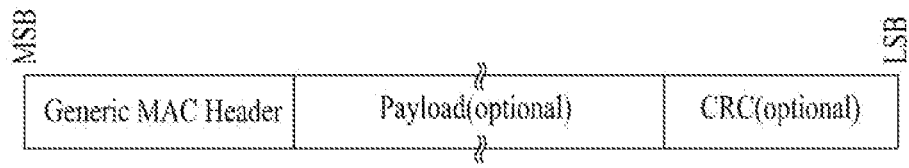
FIG. 6 illustrates a drawing showing an example of an MAC PDU (MAC Protocol Data Unit) format defined in an IEEE 802.16 based communication system.

FIG. 6 illustrates a drawing showing an example of an MAC PDU (MAC Protocol Data Unit) format defined in an IEEE 802.16 based communication system.

Generally, the link layer (i.e., Link layer or MAC layer) and the Physical layer below the second layer, the protocol respective to each system, such as LAN, Wireless LAN, 3GPP/3GPP2 or Wireless MAN, and so on, and the header format of the respective MAC PDUs are defined differently. In order to perform data transport (or transmission) between each node within the link layer, the MAC header includes a MAC address or link address of the node and may include a head error check and link layer control information.

Referring to FIG. 6, each MAC PDU begins with a MAC header of a predetermined length. The header is located in front of a payload of the MAC PDU. The payload of the MAC PDU may include a MAC SDU and a Fragment. The length of payload information may also be changed in order to be capable of expressing a variable number of bytes. Accordingly, the MAC Sublayer may transmit diverse traffic types of the higher layer without having to identify the format or bit pattern of a message. Additionally, a CRC (Cyclic Redundancy Check) for detecting error may be included in the MAC PDU. The CRC function may be realized in the physical layer of an OFDMA system.

Figure 7:
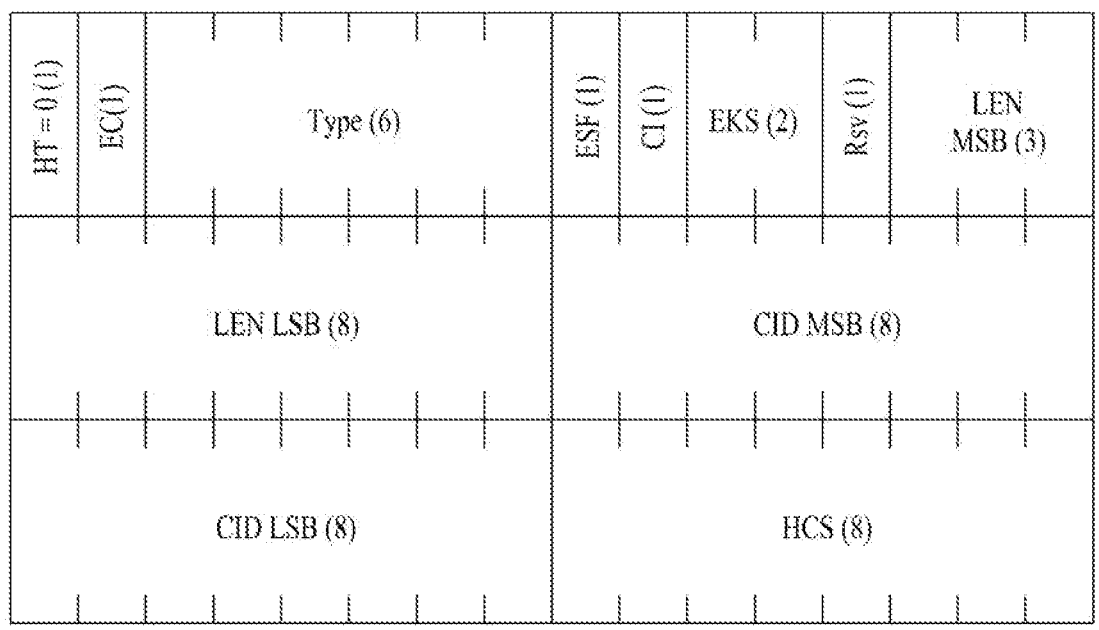
FIG. 7 illustrates an example of an MAC header format used in an IEEE 802.16 based communication system.

FIG. 7 illustrates an example of an MAC header format used in an IEEE 802.16 based communication system. Hereinafter, in this specification, one graduation (or scale) of a block representing a header structure including FIG. 6 indicates 1 bit, and a horizontal sequence (or row) indicates one byte, and alignment is established in a descending order starting from a most significant bit (MBS) to a least significant bit (LSB).

Referring to FIG. 7, in the PAC PDU, 6 subheaders may be used along with a general (or generic) MAC header. The subheader for each MAC PDU is inserted after the general (or generic) MAC header. Each field included in the MAC header will hereinafter be described in detail.

A HT (Header Type) field corresponds to a field indicating a header type and indicates whether the corresponding MAC PDU corresponds to a general MAC header or whether the corresponding MAC PDU corresponds to a signaling header (signalling header) for controlling BR (Bandwidth Request), and so on. An EC (Encryption Control) field corresponds to a field indicating encryption control and indicates whether or not the payload has been encrypted. A Type field indicates the presence or absence of a subheader being added after the header and also indicates the type of the subheader. An ESF (Extended Subheader Field) field indicates the presence or absence of an extended subheader being added after the header.

Additionally, a CI (CRC Indication) field indicates whether or not a CRC is added after the payload. An EKS (Encryption Key Sequence) field indicates an encryption key sequence number that is used for encryption, when the payload is being encrypted. A LEN (LENgth) field indicates the length of a MAC PDU. A CID (Connection Identifier) field indicates a connection identifier through which the MAC PDU is being transmitted. A Connection is used as an identifier of a MAC layer for performing data and message delivery (or transport) between the base station and the user equipment, and the CID performs a function of identifying a specific user equipment or identifying a specific service between the base station and the user equipment. An HCS (Header Check Sequence) is used for detecting an error of the header. In FIG. 6, the numbers marked between parentheses after the name of each field represent the number of bits occupied by each field.

Figure 8:
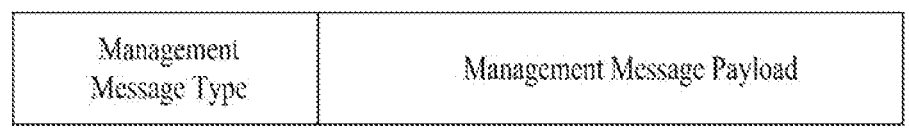
FIG. 8 illustrates a format of an MAC management message used in an IEEE 802.16 based communication system.

Hereinafter, the format of a MAC management message will be described with reference to FIG. 8. FIG. 8 illustrates a format of an MAC management message used in a generally used IEEE 802.16 based communication system.

Referring to FIG. 8, a Management message is delivered (or transported) through the payload of a MAC PDU and begins with a management message type field. MAC management messages respective to Basic, broadcast, or initial ranging connections are not processed with packing or fragmentation. However, MAC management messages respective to Primary management connection may be processed with packing or fragmentation. Examples of such MAC management messages may include DCD (Downlink Channel Descriptor) messages, downlink map (DL map) messages, ranging request (RNG-REQ) messages, and so on.

In the perspective of a MAC header in a general communication system, the functions of a MAC management connection identifier (MAC management CID) are as follows.

For example, when the user equipment requests the base station for a bandwidth, the user equipment transmits a BR (Bandwidth Request) header to the base station. In the bandwidth request header (BR header), the function of the MAC management connection ID (MAC management CID) is to indicate Quality of Service (hereinafter referred to as "QoS") information of a connection requested by the user equipment. Such QoS information indicates whether or not the corresponding connection is delay sensitive. In other words, such QoS information indicates whether the corresponding connection corresponds to a Basic management connection or whether the corresponding connection corresponds to a primary management connection. However, since the user equipment is substantially required to notify the base station only of the QoS information, the connection identifier (CID) is not absolutely required to be included in the signaling header.

Additionally, in the MAC PDU for transmitting management messages, the function of a management CID field, which is included in a GMH (Generic MAC Header, hereinafter referred to as "GMH"), is to indicate that the payload includes a management message. Moreover, if the user equipment notifies the base station only of the information on whether or not a management message is included in the payload, the management connection identifier field is not absolutely required to be included in the GMH.

Furthermore, since a flow identifier (flow ID) is defined in the header, which is used for MAC management message transmission, a MAC management connection may be identified. In the GMH, a flow identifier respective to a management connection may indicate whether or not a management message has been processed with fragmentation. Since such information may be replaced through a field indicating whether or not a subheader is being included, the flow identifier field may also be omitted.

Client cooperation (CC) (or client cooperative) communication, to which the present invention can be applied, corresponds to a method of having one or two or more user equipment cooperate with one another so as to transmit the same data to the base station.

User equipments participating in client cooperation communication may be divided into Source MS (S-MS) configured to generate source data and Cooperative MS (C-MS) configured to perform cooperative transmission on the data of the S-MS to the base station. Depending upon the situation, a user equipment performing client cooperation communication (or client cooperative communication) may be operated by shifting to and from functions of the S-MS and the C-MS.

In order to allow the C-MS to perform cooperative transmission on the data of the S-MS, the S-MS should first share its data with the C-MS. A process of having the S-MS transmit data to the C-MS for the purpose of sharing data is referred to as inter-UE Direct Communication.

Additionally, client cooperation communication methods may include a Cooperative mode, wherein both the S-MS and the C-MS transmit the data of the S-MS, and a Relay mode, wherein only the C-Ms transmits the data of the S-MS. In the client cooperation communication, the S-MS and the C-MS transmit the same Data burst, and the base station simultaneously decodes the data transmitted by the S-MS and the C-MS. However, in the relay mode, only the C-MS transmits the data of the S-MS, and the base station decodes the data transmitted by the C-MS.

A data burst size may be calculated only after an uplink (UL) grant is received, and UL transmission should be performed within a predetermined period of time after receiving the UL grant, e.g., within a frame duration of a frame that has received the UL grant. However, the given time is insufficient for the S-MS to change its data to a data burst and to complete the transmission to the C-Ms within a predetermined period of time after receiving the UL grant. Therefore, prior to receiving the UL grant, the S-MS is required to transmit its data to the C-MS in MAC PDU or MAC SDU units through a higher layer of a system, in which client cooperation communication is to be realized (or performed).

Meanwhile, in the client cooperation communication, the S-MS and the C-MS are required to generate the same data burst, and, most particularly, in the relay mode, in accordance with a priority level assigned to the S-MS, the MAC PDU or SDU that is to be transmitted firsthand should be decided. In other words, in order to generate (or configure) the MAC PCU or MAC SDU into a data burst, the S-MS and the C-MS should share the same priority level.

First Embodiment

The first embodiment of the present invention proposes a method of performing the direct communication in MAC PDU units.

In case the S-MS transmits its data to the C-MS in MAC PDU units, the data burst size that is actually used in the client cooperation communication cannot always be the same as the size of the MAC PDU. As described above, one or two or more MAC PDUs may be selected and carried in one data burst. Additionally, one MAC PDU cannot be divided and carried in multiple data bursts. Therefore, in order to generate a data burst having a pre-decided size, the user equipment should first define a priority level according to which the user equipment can be capable of deciding which MAC PDU is to be first carried in the data burst.

Similarly, in case of the client cooperation communication, in order to allow the C-MS to generate the same data burst as the S-MS (or in order to allow the C-MS to generate a data burst by using the same method as the S-MS), a Priority level respective to which MAC PDU, among the MAC PDUs received from the S-MS, is to be included in the data burst firsthand should be defined, and the corresponding priority level should be the same as the order used by the S-MS for selecting the MAC PDU when generating the data burst.

Therefore, the first embodiment of the present invention proposes a method for deciding the priority level of the MAC PDU as described below, in order to allow the S-MS and the C-MS to generate the same data burst.

1) One the methods that can be most simply considered is a method of defining a priority level respective to the size of the MAC PDU. More specifically, the user equipment selects one MAC PDU or a combined MAC PDU that can minimize padding bits of the data burst.

For example, in case the size of the data burst is equal to 100, and when the size of the MAC PDUs are respectively equal to 20, 30, 50, and 70, the MAC PDU having the largest size of 70 first occupies the data burst, and, then, the MAC PDU having the size of 30 occupies the data burst, so as to generate a data burst having minimum or no padding bits.

2) Secondly, the priority level is decided in accordance with a MAC PDU transmission order. It will be assumed that the S-MS defines the priority level of the MAC PDU and that the S-MS transmits the MAC PDU to the C-MS in accordance with the defined order. The C-MS includes the MAC PDU first received in the data burst firsthand. However, in case the size of the data burst is smaller than the size of the MAC PDU, the C-MS selects a MAC PDU that can be fully accommodated (or carried) in the data burst among the MAC PDUs corresponding to the next priority level. Additionally, when the S-MS transmits a MAC PDU to the C-MS, the S-MS may perform transmission after including information on a Transmission number of the MAC PDU.

Finally, deciding the MAC PDU priority level when generating a data burst, based upon a QoS priority level of a MAC PDU, may be taken into consideration. In this case, which MAC PDU is to be first used to generate the data burst may be decided, based upon the QoS parameters (i.e., an FID (Flow ID) and QoS parameter of services corresponding to the FID) of one or more MAC SDUs carried in one MAC PDU or based upon a predetermined priority level of the service flow itself. Meanwhile, the QoS priority level of the MAC PDU may be provided by the base station as described below or may be equally set up for the S-MS and the C-MS through a method provided by the S-MS.

As a method for transmitting service flow information on the S-MS to the C-MS, the base station may directly transmit the service flow information on the S-MS to the C-MS. The C-MS may determine the FID of the S-MS, which is carried in the header (AGMH, MEH) of the MAC PDU. However, since the type of the service flow cannot be determined by using only the FID of the S-MS, the base station provides the C-MS with additional information on all service flows of the S-MS. At this point, the additional information on the service flows should include information on which service flow the FID of the S-MS is mapped to, i.e., a QoS parameter respective to each of the service flows of the S-MS should be included. Meanwhile, information on the predetermined priority level of the service flow itself may also be included in the additional information on the service flows. Additionally, with respect to the MAC PDU carrying the MAC SDU of multiple service flows, the S-MS and the C-MS should define where to apply weight in order to decide the priority level of the MAC PDU by using the same rule.

Next, there is a method of having the S-MS decide in advance the QoS priority level of the MAC PDU and to transmit the decided QoS priority level to the C-MS, instead of having the base station transmit the service flow information of the S-MS to the C-MS. A separate header, e.g., a direct communication header (DCH) is designed in front of the MAC PDU, which is being transmitted via direct communication, and the QoS priority level of the MAP PDU, which is predefined by the S-MS, is added to the DCH and then transmitted to the C-MS along with the MAC PDU.

Second Embodiment

The second embodiment of the present invention proposes a method of performing the direct communication in MAC SDU units. In case the S-MS transmits data to the C-MS in MAC SDU units, just as described in the first embodiment, the C-MS should generate the MAC PDU by using the same method as the S-MS.

The C-MS should insert an FID of the S-MS in the MAC PDU header when generating the MAC PDU. Therefore, in order to notify the FID of the S-MS to the C-MS, a direct communication header (DCH), which is added in front of the MAC SDU being transmitted to the C-MS via direct communication, is designed, and it should first be considered to include an FID corresponding to the MAC SDU in the DCH and to transmit the FID along with the MAC SDU to the C-MS.

Additionally, in order to allow the C-MS to generate the MAC PDU by using the same method as the S-MS, the following methods may be used.

a) First of all, a method of deciding the priority level may be considered, in accordance with a MAC SDU transmission order (or transmission number). More specifically, in a state when the S-MS has already decided the priority level of the MAC SDU in advance, it will be assumed that the MAC SDU is transmitted to the C-MS in accordance with the same priority level. Therefore, the C-MS includes the first MAC SDU received in the MAC PDU firsthand. Additionally, when transmitting the MAC SDU, the S-MS may include and transmit information on the Transmission number of the MAC SDU.

b) Next, a method of deciding the priority level of an MAC SDU, which is to be included when generating the MAC SDU, may also be taken into consideration in accordance with a priority level for each service flow. This method may be designed as two different types in accordance with the subject providing the service flow information of the S-MS.

First of all, there is a method of having the base station provide the service flow information of the S-MS to the C-MS. The base station provides the service flow information of the S-MS to the C-MS in advance. At this point, the service flow information should include information on the service flow to which the FID of the S-MS is being mapped and QoS parameters respective to each service flow of the S-MS (i.e., an FID (Flow ID) and QoS parameter of services corresponding to the FID).

Meanwhile, information on a predetermined priority level of the service flow itself may also be included in the service flow information. At this point, it is preferable to also transmit information on whether or not the MAC SDU of the corresponding service flow can be processed with fragmentation when generating the MAC PDU or whether or not an HARQ can be used. Evidently, the S-MS also follows the predetermined priority level of the service flow itself.

Next, there is a method of having the S-MS provide the service flow information to the C-MS. The priority level of the MAC SDU, which is defined by the S-MS, and the information on whether or not the MAC SDU of the corresponding service flow can be processed with fragmentation when generating the MAC PDU or whether or not an HARQ can be used, are transmitted to the C-MS via direct communication along with the DCH, which is being transmitted along with the MAC SDU of the S-MS.

In the above-described second embodiment, after receiving the MAC SDU, the C-MS generates a MAC PDU that is to be used for the client cooperative communication by passing through the MAC layer of the C-MS. At this point, in order to allow the C-Ms to generate the same MAC PDU as the S-MS, the MAC layer of the C-MS should be operated as though the MAC layer of the C-MS is the MAC layer of the S-MS, and the following details should be taken into consideration.

First of all, apart from the MAC SDU received from the S-MS, when configuring the MAC PDU, the C-MS should not multiplex its own MAC SDU, MAC MSG, signaling header, and so on. Additionally, when generating the MAC PDU, it is preferable that the C-MS does not use a procedure of using a unique STID (Station Identifier) of the user equipment along with a user equipment-specific MAC layer procedure (e.g., encryption).

Meanwhile, when performing the client cooperative communication, in addition to the above-described first embodiment and second embodiment, limiting the data that are to be transmitted to data respective to one service of the S-MS may also be considered. In this case, since data of only one service flow exist in one MAC PDU, the priority level of the QoS, and so on, is not required to be taken into consideration.

Additionally, in order to perform client cooperative communication, a method of individually assigning (or allocating) a resource for each one service flow may be taken into consideration. In this case, only a MAC SDU corresponding to one service flows exists in one MAC PDU, and it will be preferable to configure one data burst within only one MAC PDU.

Meanwhile, in order to perform client cooperative communication, the base station may reserve a consistent range of FID values. Therefore, the service flow of the S-MS being involved (or participating) in the client cooperative communication is only assigned with the reserved FID from the base station. Additionally, in case of applying only the data respective to a single service flow to the client cooperative communication, the S-MS is not required to share its FID with the C-MS.

Finally, in order to perform client cooperative communication, a method of having the C-MS configure a service flow with the base station that is identical to the service flow of the S-MS and be allocated (or assigned) with the same FID may be taken into consideration. However, it will be apparent that an FID for an individual transmission other than the client cooperative communication cannot be overlapped with the FID of the S-MS.

Figure 9:
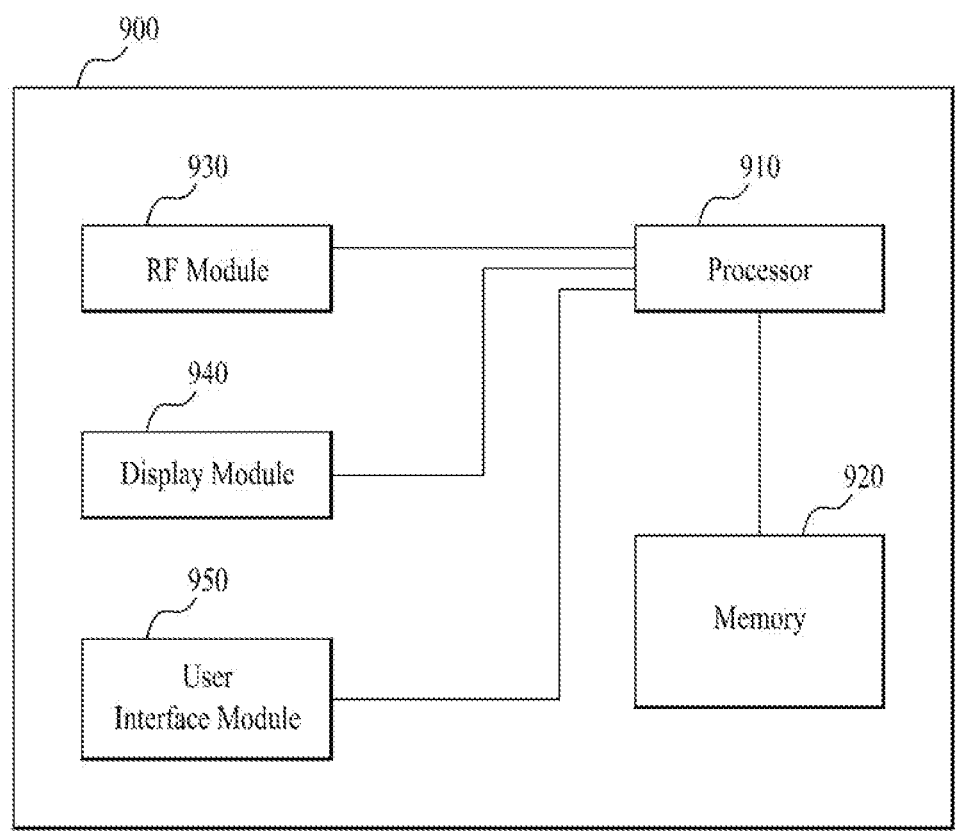
FIG. 9 illustrates a block view showing an exemplary structure of a communication device according to an exemplary embodiment of the present invention.

FIG. 9 illustrates a block view showing an exemplary structure of a communication device according to an exemplary embodiment of the present invention.

Referring to FIG. 9, a communication device (900) includes a processor (910), a memory (920), an RF module (930), a display module (940), and a user interface module (950).

The communication device (900) is an exemplary illustration provided to simplify the description and, therefore, some of the modules may be omitted. Also, the communication device (900) may further include necessary modules. Also, in the communication device (900) some of the modules may be divided into more segmented modules. Referring to the drawing, the processor (910) is configured to perform operations according to the embodiment of the present invention. More specifically, for the detailed operations of the processor (910), reference may be made to the description given with reference to FIG. 1 to FIG. 8.

The memory (920) is connected to the processor (910) and stores operating systems, applications, program codes, data, and so on. The RF module (930) is connected to the processor (910) and performs a function of converting baseband signals to radio (or wireless) signals or converting radio signals to baseband signals. In order to do so, the RF module (930) performs analog conversion, amplification, filtering, and frequency uplink conversion or inverse processes of the same. The display module (940) is connected to the processor (910) and displays diverse information. Although the display module (940) is not limited only to the example given herein, generally known elements, such as LCD (Liquid Crystal Display), LED (Light Emitting Diode), OLED (Organic Light Emitting Diode) may also be used as the display module (940). The user interface module (950) is connected to the processor (910), and the user interface module (950) may be configured of a combination of generally known user interfaces, such as keypads, touch-screens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, the embodiments of the present invention have been described by mainly focusing on the data transmission and reception relation between the relay node and the base station. Occasionally, in this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

What is claimed is:

1. A method for transmitting a signal at a cooperative user equipment in a wireless communication system supporting client cooperative communication, the method comprising:
   receiving one or more packets configured in predetermined units from a source user equipment;
   configuring a data burst respective to the source user equipment based on the predetermined units by including the one or more packets in the data burst based on a first priority level used by the cooperative user equipment; and
   transmitting the data burst to a base station,
   wherein the one or more packets are configured in one of service data units (SDUs) or protocol data units (PDUs),
   wherein the first priority level used by the cooperative user equipment is the same as a second priority level used by the source user equipment, and
   wherein the first priority level is a priority level of a service flow respective to each of the one or more packets.

2. The method of claim 1, wherein the source user equipment transmits a data burst identical to that of the cooperative user equipment to the base station.

3. The method of claim 1, further comprising:
   receiving information on the priority level of the service flow from the source user equipment when the one or more packets are configured in the protocol data units (PDUs).

4. The method of claim 1, further comprising:
   receiving information on the priority level of the service flow from the base station when the one or more packets are configured in the protocol data units (PDUs).

5. The method of claim 1,
   wherein, when the one or more packets are configured in the service data units (SDUs), the service flow is identified by a Flow Identifier (FID) indicating whether or not a management message has been processed with fragmentation.

6. The method of claim 1, wherein the configuring a data burst comprises:
   including the one or more packets in the data burst, so that padding bits of the data burst can be minimized, based on sizes of the one or more packets.

7. A cooperative user equipment device in a wireless communication system supporting client cooperative communication, the cooperative user equipment comprising:
   a receiver configured to receive one or more packets configured in predetermined units from a source user equipment;
   a processor configured to configure a data burst respective to the source user equipment by including the one or more packets in the data burst based on a first priority level used by the cooperative user equipment; and
   a transmitter configured to transmit the data burst to a base station,
   wherein the one or more packets are configured in one of service data units (SDUs) or protocol data units (PDUs),
   wherein the first priority level used by the cooperative user equipment is the same as a second priority level used by the source user equipment, and
   wherein the first priority level is a priority level of a service flow respective to each of the one or more packets.

* * * * *